(12) United States Patent  
Benson (10) Patent No.: US 8,379,948 B2  
(45) Date of Patent: Feb. 19, 2013

(54) METHODS AND SYSTEMS FOR FAST ITERATIVE RECONSTRUCTION USING SEPARABLE SYSTEM MODELS

(75) Inventor: Thomas Matthew Benson, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 233 days.

(21) Appl. No.: 12/974,723

(22) Filed: Dec. 21, 2010

(65) Prior Publication Data

US 2012/0155729 A1 Jun. 21, 2012

(51) Int. Cl.  
*G06K 9/00* (2006.01)

(52) U.S. Cl. .............................. 382/128; 128/922; 378/4

(58) Field of Classification Search .................. 382/100, 382/128, 129, 130, 131, 132; 128/922; 378/4–27  
See application file for complete search history.

(56) References Cited

U.S. PATENT DOCUMENTS

| | | | | |
|---|---|---|---|---|
| 4,064,440 | A * | 12/1977 | Roder | 378/57 |
| 5,331,552 | A * | 7/1994 | Lloyd et al. | 378/15 |
| 6,014,419 | A * | 1/2000 | Hu | 378/4 |
| 6,178,223 | B1 * | 1/2001 | Solomon et al. | 378/62 |
| 6,327,331 | B1 * | 12/2001 | Toth et al. | 378/20 |
| 6,493,415 | B1 * | 12/2002 | Arai et al. | 378/4 |
| 6,862,335 | B2 | 3/2005 | Basu et al. | |
| 6,963,631 | B2 * | 11/2005 | Brunnett | 378/98.8 |
| 7,227,982 | B2 | 6/2007 | De Man et al. | |
| 2006/0251210 | A1 * | 11/2006 | Chao et al. | 378/19 |
| 2007/0018108 | A1 | 1/2007 | Kitamura | |
| 2007/0297656 | A1 | 12/2007 | DeMan et al. | |
| 2008/0118020 | A1 * | 5/2008 | Thibault et al. | 378/4 |
| 2009/0232377 | A1 | 9/2009 | Miao et al. | |
| 2010/0166140 | A1 | 7/2010 | Proksa | |

OTHER PUBLICATIONS

Yong Long Fessler et al.; "3D Forward and Back-Projection for X-Ray CT Using Separable Footprints"; Issue Date: Nov. 2010; Date of Publication: Jun. 6, 2010; vol. 29; Abstract—2 Pages Guangzhi Cao Bouman et al.; "Noniterative MAP Reconstruction Using Sparse Matrix Representations"; Date of Publication: Jun. 22, 2009; Issue Date: Sep. 2009; Abstract—2 Pages.

* cited by examiner

*Primary Examiner* — Anand Bhatnagar  
(74) *Attorney, Agent, or Firm* — Scott J. Asmus (57) ABSTRACT

Methods and systems for iterative image reconstruction. The method includes selecting a particular X and Y location corresponding to one or more selected voxels in an image volume. Further, one or more Z locations are iteratively selected for the particular X and Y location. One or more partial sums corresponding to channel dependent portions of a separable system model associated with the particular X and Y location are pre-computed. Additionally, row-dependent portions of the separable system model are computed independent of the pre-computing of the one or more partial sums. The partial sums and the row-dependent portions of the separable system model are combined to compute corresponding updates for the selected voxels. The one or more partial sums are then updated to be consistent with the computed updates. Additionally, the computed updates are applied to the selected voxels independent of updating the one or more partial sums.

20 Claims, 4 Drawing Sheets

METHODS AND SYSTEMS FOR FAST ITERATIVE RECONSTRUCTION USING SEPARABLE SYSTEM MODELS

BACKGROUND

Embodiments of the present disclosure relate generally to diagnostic imaging, and more particularly to methods and systems for fast iterative reconstruction using separable system models.

Non-invasive imaging techniques are widely used for diagnostic imaging in applications such as security screening, quality control, and medical imaging systems. Particularly, in medical imaging, a non-invasive imaging technique such as computed tomography (CT) is used for unobtrusive, convenient and fast imaging of underlying tissues and organs. To that end, the CT systems operate by projecting fan or cone shaped X-ray beams through an object. The attenuated beams are then detected by a set of detector elements. Each detector element produces a signal based on the intensity of the attenuated X-ray beams, and these signals are processed to produce projection data, also called sinogram data. Useful images are formed from the projection data with the use of one or more image reconstruction techniques.

In CT, the operation that transforms an N-Dimension image into an M-Dimension set of line integrals is called the forward projection or re-projection, whereas the transpose of this operation is called back-projection. Conventional CT imaging techniques employ direct reconstruction techniques, such as filtered back-projection (FBP) that are generally fast and computationally efficient, as they allow reconstruction of a three-dimensional (3D) image data set in a single reconstruction step. Certain other imaging techniques employ iterative reconstruction algorithms that iteratively update the reconstructed image volume. Use of iterative reconstruction techniques typically provides greater flexibility in selectively enhancing imaging metrics based on specific application requirements.

By way of example, iterative reconstruction techniques provide greater flexibility with respect to acquisition geometry, enforcement of a prior knowledge, and modeling of physical effects, including x-ray source modeling, detector modeling, scatter modeling and/or beam-hardening modeling. Particularly, iterative reconstruction techniques have been employed to improve one or more imaging metrics, such as reducing radiation dose, noise and/or artifacts through iterative processing. By way of example, certain iterative reconstruction techniques perform model-based estimation requiring reconstructions of several images followed by iterative updates of the two or three-dimensional image data set until desired imaging criteria are met.

Iterative reconstruction techniques, however, require enormous amounts of complex computation and may not be efficient in practice unless the volume to be reconstructed is small. In addition, iterative reconstruction techniques are generally much slower than the direct reconstruction techniques. Accordingly, certain techniques have been proposed for reducing the computational cost of iterative reconstruction, such as, ordered subsets, relaxation factors for convergence acceleration, and acceleration of the projector and the back projector.

It is desirable to develop effective methods and systems that enable fast iterative image reconstruction by effectively reducing the required run-time per iteration. Particularly, there is a need for an iterative image reconstruction technique that includes reduced computational requirements and/or improved data access schemes that result in better speed.

BRIEF DESCRIPTION

In accordance with aspects of the present technique, an image reconstruction method is presented. The method includes selecting a particular X and Y location corresponding to one or more selected voxels in an image volume. Further, one or more Z locations are iteratively selected for the particular X and Y location. One or more partial sums corresponding to channel dependent portions of a separable system model associated with the particular X and Y location are pre-computed. Additionally, row-dependent portions of the separable system model are computed independent of the pre-computing of the one or more partial sums. Further, the partial sums and the row-dependent portions of the separable system model are combined to compute corresponding updates for the one or more selected voxels. The one or more partial sums are then updated to be consistent with the computed updates. Additionally, the computed updates are applied to the selected voxels independent of updating the one or more partial sums.

In accordance with another aspect of the present technique, an alternative image reconstruction method is described. The method includes selecting a particular X and Y location corresponding to one or more selected voxels in an image volume. Further, one or more Z locations are iteratively selected for the particular X and Y location. The particular X and Y location and the selected Z locations are associated with a separable system model. Further, initial voxel updates for the one or more selected voxels are pre-computed. Additionally, pair-wise voxel update correlations between one or more pairs of the one or more selected voxels are also pre-computed. Subsequently, one or more updates for the one or more selected voxels are computed using the initial voxel updates, voxel update correlations and previously computed updates. The computed updates are then applied to the one or more selected voxels.

In accordance with further aspects of the present technique, a non-transitory computer readable storage medium with an executable program thereon for iterative image reconstruction is disclosed. Particularly, the executable program instructs a processing unit to selects a particular X and Y location corresponding to one or more selected voxels in an image volume. Further, one or more Z locations are iteratively selected for the particular X and Y location. One or more partial sums corresponding to channel dependent portions of a separable system model associated with the particular X and Y location are pre-computed under program instruction. Additionally, row-dependent portions of the separable system model are computed independent of the pre-computing of the one or more partial sums. Further, the partial sums and the row-dependent portions of the separable system model are combined to compute corresponding updates for the one or more selected voxels. The processing unit then updates the one or more partial sums updated to be consistent with the computed updates. Additionally, the computed updates are applied to the selected voxels independent of updating the one or more partial sums.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents systems and methods for fast iterative image reconstruction. Particularly, certain embodiments illustrated herein describe methods and systems for fast iterative reconstruction using separable system models. Although the following description describes the image reconstruction technique in the context of medical imaging, the present techniques may be implemented in various other imaging systems and applications to generate diagnostic images with minimal processing and memory utilization. By way of example, the present techniques may be implemented in other non-invasive imaging contexts, such as security screening and industrial nondestructive evaluation of manufactured parts. An exemplary system that is suitable for practicing various implementations of the present technique is described in the following section with reference to FIG. 1.

Figure 1:
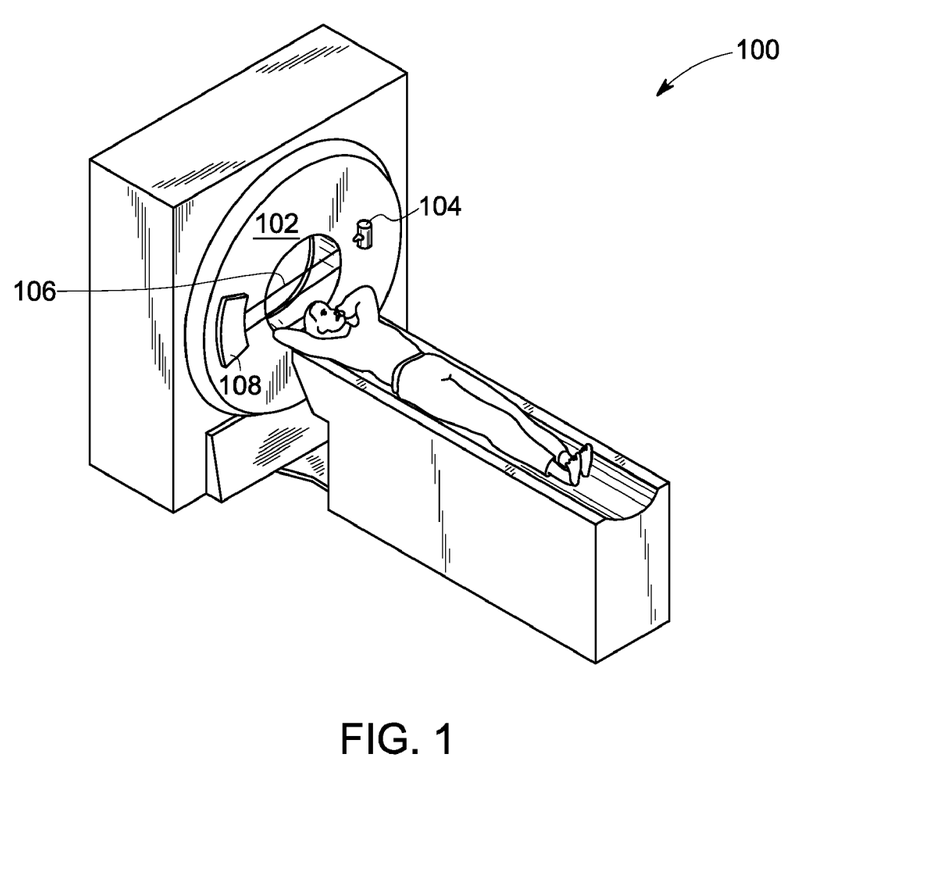
FIG. 1 is a pictorial view of a CT system.

FIG. 1 illustrates an exemplary CT system 100 for acquiring and processing projection data. In one embodiment, the CT system 100 includes a gantry 102. The gantry 102 further includes at least one X-ray radiation source 104 that projects a beam of X-ray radiation 106 towards a detector array 108 positioned on the opposite side of the gantry 102. Although FIG. 1 depicts a single X-ray radiation source 104, in certain embodiments, multiple radiation sources may be employed to project a plurality of X-ray beams for acquiring projection data from different view angles. In one embodiment, the X-ray radiation source 104 projects the X-ray beam 106 towards the detector array 108 so as to enable acquisition of projection data corresponding to a desired image volume corresponding to a patient. One or more specific structures and functions of the CT system 100 that expedite iterative image reconstruction processes by using separable system models will be described in greater detail with reference to FIGS. 2-3 in the following sections.

Figure 2:
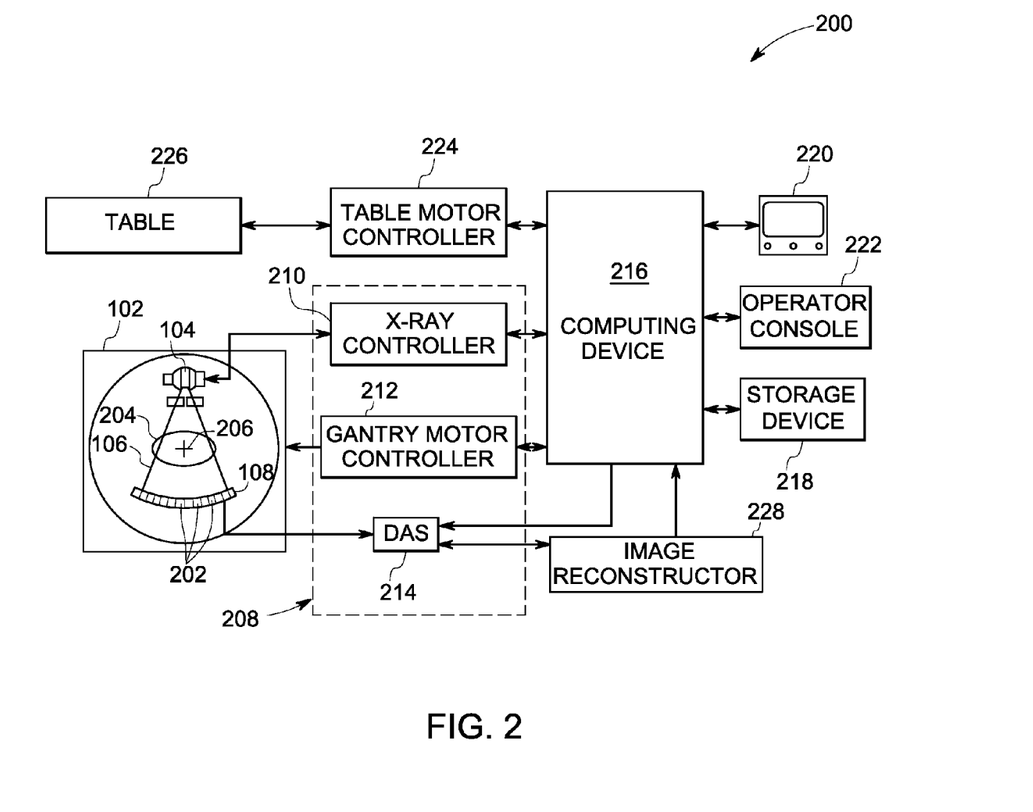
FIG. 2 is a block schematic diagram of an exemplary imaging system, in accordance with aspects of the present technique.

FIG. 2 illustrates an imaging system 200, similar to the CT system 100 of FIG. 1, for acquiring and processing projection data. In certain embodiments, the imaging system 200, however, may differ from the CT system 100 in one or more structural and functional aspects. By way of example, the detector array 108 of the imaging system 200 includes a plurality of detector elements 202 that together sense the projected X-ray beams that pass through an object 204, such as a medical patient, industrial component, or baggage, to acquire corresponding projection data. Accordingly, in one embodiment, the detector array 108 may be fabricated in a multi-slice configuration including the plurality of rows of cells or detector elements 202. In such a configuration, one or more additional rows of the detector elements 202 may typically be arranged in a parallel configuration for acquiring projection data.

Further, during a scan to acquire the projection data, the gantry 102 and the components mounted thereon rotate about a center of rotation 206 for acquiring projection data. Alternatively, in embodiments where a projection angle relative to the object 204 varies as a function of time, the mounted components may move along a general curve rather than along a segment of a circle. Accordingly, the rotation of the gantry 102 and the operation of the X-ray radiation source 104 may be controlled by a control mechanism 208 of the imaging system 200 to acquire projection data from a desired view angle and at a desired energy level. In one embodiment, the control mechanism 208 may include an X-ray controller 210 that provides power and timing signals to the X-ray radiation source 104 and a gantry motor controller 212 that controls the rotational speed and position of the gantry 102 based on scanning requirements.

The control mechanism 208 may further include a data acquisition system (DAS) 214 for sampling analog data received from the detector elements 202 and converting the analog data to digital signals for subsequent processing. The data sampled and digitized by the DAS 214 may be transmitted to a computing device 216. The computing device 216 may store this data in a storage device 218, such as a hard disk drive, a floppy disk drive, a compact disk-read/write (CD-R/W) drive, a Digital Versatile Disc (DVD) drive, a flash drive, or a solid state storage device.

Additionally, the computing device 216 may provide appropriate commands and parameters to one or more of the DAS 214, the X-ray controller 210 and the gantry motor controller 212 for operating the imaging system 200. Accordingly, in one embodiment, the computing device 216 is operatively coupled to a display 220 that allows an operator to observe object images and/or specify commands and scanning parameters via a console 222 that may include a keyboard (not shown). In addition, the user may dynamically configure various system and/or imaging parameters. The computing device 216 uses the operator supplied and/or system defined commands and parameters to operate a table motor controller 224 that, in turn, controls a motorized table 226. Particularly, the table motor controller 224 moves the table 226 for appropriately positioning the object 204, such as the patient, in the gantry 102 to enable the detector elements 202 to acquire corresponding projection data.

As previously noted, the DAS 214 samples and digitizes the data acquired by the detector elements 202. Subsequently, an image reconstructor 228 uses the sampled and digitized X-ray data to perform high-speed reconstruction. Although, FIG. 2 illustrates the image reconstructor 228 as a separate entity, in certain embodiments, the image reconstructor 228 may form part of the computing device 216. Alternatively, the image reconstructor 228 may be absent from the system 200 and instead the computing device 216 may perform one or more functions of the image reconstructor 228.

In the present embodiment, the image reconstructor 228 uses, for example, a model based image reconstruction technique that employs a system model to generate forward and backprojections. By way of example, the system model can be represented as a system matrix A where an element $a_{ij}$ represents a relationship between a projection ray i and a voxel j. Particularly, in accordance with aspects of the present technique, the system model may express the property of "separability." As used herein, the term "separability" indicates that the element $a_{ij}$ can be written as a product of row, $r_{ij}$ and channel-dependent portions, $c_{ij}$ of the system model. Accordingly, the element $a_{ij}$ may be written as $a_{ij}=r_{ij}*c_{ij}$ where each of $r_{ij}$ and $c_{ij}$ are invariant in at least one dimension.

Further, in one exemplary implementation, the variables v, m, and k define the view, detector row, and detector channel indices, respectively, such that index i uniquely defines v, m, and k. Additionally, X, Y, and Z may be defined as the coordinates of voxel j where X and Y are in a plane parallel to the gantry and Z is parallel to the axis of rotation. In one particular embodiment, $r_{ij}$ does not vary with k and $c_{ij}$ does not vary with m or Z. Accordingly, the channel-dependent portion of the system model $c_{ij}$ and row-dependent portion of the system model $r_{ij}$ may be stored without redundancy to exploit the defined invariance properties. Here, it may be noted that invariance could apply in other dimensions depending on the specific system model or the acquisition geometry used in reconstruction. Particularly, in accordance with aspects of the present technique, the image reconstructor 228 exploits this invariance property to pre-compute data into a lower dimensional space such that all or at least a range of voxels parallel to, for example, the Z axis at a fixed (X, Y) location are expeditiously updated.

With reference to the previously defined separability property, the term "lower dimensional space," in one embodiment, corresponds to a space depending only on the view and the detector row dimension, but not the dimension of the detector channel within a fixed row. The full dimensional space, however, would additionally include the dimension of a detector channel within a fixed detector row. The image reconstructor 228, thus, references the corresponding full dimensional space only during the pre-computation and while updating the voxels after having computed one or more Z update calculations. The pre-computation of data into the lower dimensional space reduces the amount of calculations and arranges a more favorable memory access pattern for the updates along the Z direction, thus, decreasing the final run-time for the image reconstruction.

The image reconstructor 228 then either stores the reconstructed images in the storage device 218 or transmits the reconstructed images to the computing device 216 for generating useful information for diagnosis and evaluation. The computing device 216 may transmit the reconstructed images and other useful information to the display 220 that allows the operator to evaluate the imaged anatomy. An exemplary method for fast iterative image reconstruction using separable system models is described in greater detail with reference to FIG. 3.

Figure 3:
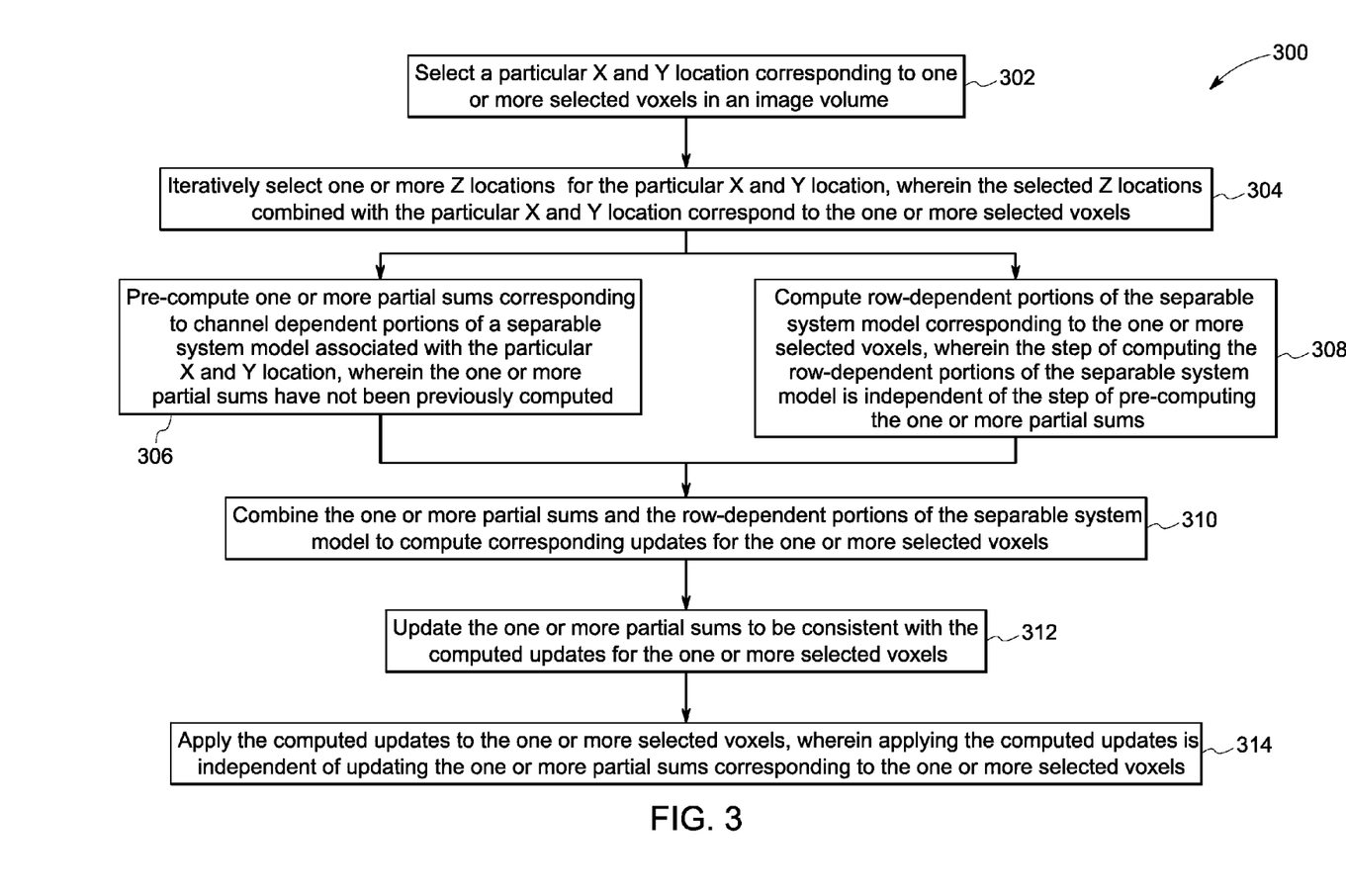
FIG. 3 is a flow chart depicting an exemplary iterative image reconstruction method using a separable system model, in accordance with aspects of the present technique.

FIG. 3 illustrates a flow chart 300 depicting an exemplary iterative image reconstruction method using separable system models. The exemplary method may be described in a general context of computer executable instructions on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a communication network. In the distributed computing environment, the computer executable instructions may be located in both local and remote computer storage media, including memory storage devices.

Further, in FIG. 3, the exemplary method is illustrated as a collection of blocks in a logical flow chart, which represents operations that may be implemented in hardware, software, or combinations thereof. The various operations are depicted in the blocks to illustrate the functions that are performed, for example, during pre-computing the partial sums for a voxel, updating the partial sums and image reconstruction phases of the exemplary method. In the context of software, the blocks represent computer instructions that, when executed by one or more processing subsystems, perform the recited operations of an imaging system such as the imaging system 200 of FIG. 2. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method without departing from the spirit and scope of the subject matter described herein. For discussion purposes, the exemplary method will be described with reference to the elements of FIG. 2.

The exemplary method aims to exploit separable system models to reduce the amount of computation and arrange a more favorable memory access pattern to decrease the final run-time of the exemplary image reconstruction method. To that end, the method may employ one or more system models such as a distance-driven model and/or a separable footprint model that exhibit separability. The present method exploits this separability to pre-compute data into a lower dimensional space such that all or at least a range of voxels parallel to the Z-axis at a fixed (X, Y) location can be more expeditiously updated, thus improving the image reconstruction speed.

For clarity, the exemplary method is described in the following sections using an iterative coordinate descent algorithm. It may, however, be noted that implementation of the present method is not limited to the specific iterative reconstruction algorithm discussed in this description. In particular, the present method may be used to improve the performance of several other iterative reconstruction algorithms. A list of notations employed throughout the description of the exemplary method in lieu of various exemplary variables used during an exemplary image reconstruction is presented below.

LIST OF NOTATION (v, m, k) specifies specific view (v), row (m), channel (k) indices, where view corresponds to a specific position of a radiation source, row corresponds to a first detector dimension that lies along the axis of rotation and channel corresponds to a second detector dimension parallel to the gantry;

i is a linear index for a projection data value mapping to some (v, m, k) 3-tuple;

j is a voxel index;

$a_{ij} = a_{(v,m,k),j}$ is the system matrix element corresponding to projection ray i and voxel j;

$a_{*,j}$ is a system matrix column (i.e., a vector) containing all system matrix elements corresponding to voxel j;

c(v, m, k) is the channel component of $a_{(v,m,k),j}$;

r(v, m, k, j) is the row component of $a_{(v,m,k),j}$;

$x_j$ is the value of voxel j;

$\Delta j$ is a computed update for voxel j;

$w_i$ is the statistical weighting associated with projection ray i; and $e_i$ is the error sinogram value associated with projection ray i (i.e., $e_i = p_i - \Sigma_j a_{ij} x_j$ with $p_i$ the original projection ray value).

Further, bold letters may be used to indicate vector forms of the variables, for example, x for the image.

Conventional iterative image reconstruction techniques calculate the system matrix elements $a_{ij}$ corresponding to the voxel footprint on the detector, for example, using a per-view nested loop over the row and channel dimensions. By way of example, a conventional iterative image reconstruction technique first computes the system matrix column $a_{ij}$ corresponding to a voxel j. To that end, pair-wise products of the values corresponding to K channel components c and M row components r of the voxel j may be computed, thus generating K times M system matrix elements.

Subsequently, an update for the voxel j is typically computed as:

$$\Delta_j = \frac{\sum_i a_{ij} w_i e_i}{\sum_i a_{ij}^2 w_i} \quad (1)$$

Here, it may be noted that equation 1 is illustrated without a regularization component in order to focus only on the main computation. An alternative implementation of this approach, however, may use a different iterative update algorithm and may additionally include a regularization component. Further, certain iterative algorithms may exclude the statistical weighting values $w_i$ or use other weighting values.

After computing update $\Delta_j$, the error sinograms for all i are updated as:

$$\hat{e}_i = e_i + \Delta_j a_{ij} \quad (2)$$

The conventional image reconstruction techniques are then repeated for additional voxel locations. Accordingly, when there is correlation between two voxels along the Z direction, the conventional image reconstruction technique requires multiple accesses to the $w_i$ and $e_i$ values that correspond to the correlated voxels. The multiple memory accesses associated with loading and storing the $e_i$ and $w_i$ values in conventional iterative image reconstruction techniques can create a performance bottleneck for fast image reconstruction.

Unlike such conventional image reconstruction techniques that compute the entire system matrix, the present method exploits the separability of the system model to reduce computation and memory access associated with the conventional approach. To that end, the separable system model can be represented, for example, as a system matrix A where an element $a_{ij}$ represents a relationship between a projection ray i and a selected voxel j. Particularly, in one embodiment, the system matrix is a two-dimensional matrix where the row direction corresponds to the projection data domain, whereas the column direction corresponds to the image volume domain.

Typically, columns $a_{*j}$ of the system matrix correspond to pair-wise products of elements of the row and channel-dependent portions of the system model. Conventional techniques compute each of these pair-wise products to progressively generate a portion of the system matrix before updating the selected voxels. Conventional iterative image reconstruction techniques, thus, explicitly compute and store portions of the system matrix on the fly in order to perform the operations that utilize the system matrix.

The present method, however, exploits the independence of the channel-dependent portion, c(v, m, k) from the detector row index m for each (v, k) pair to separate the calculations corresponding to the channel and row-dependent portions. It may be noted that $a_{ij}$=r(v, m, k, j)×c(v, m, k), where "r" and "c" correspond to the associated row and channel-dependent portions of the system model, respectively, corresponding to a specific X and Y location.

Accordingly, at step 302, an image reconstructor, such as the image reconstructor 228 of FIG. 2, selects a particular X and Y location corresponding to one or more selected voxels in an image volume. Additionally, at step 304, the image reconstructor iteratively selects one or more Z locations for the particular X and Y location. The selected Z locations combined with the particular X and Y location corresponds to the one or more selected voxels. By way of example, the selected voxels may correspond to a volume 512 by 512 in XY direction and 400 in the Z direction in a patient's body. The present method iteratively selects one or more Z locations corresponding to a particular X and Y location in the 512 by 512 volume for processing. Particularly, the selected Z locations may be any subset of the full set of voxels at the specified X and Y location.

The present method, then, collapses the calculation in one specific direction, for example the channel direction, to enable computation of the imaging data in a lower dimensional space. As previously noted, the lower dimensional space, in one embodiment, corresponds to a space depending only on the view and detector row dimension, but not the dimension of the detector channel within a fixed row.

Accordingly, at step 308, the present method pre-computes one or more partial sums corresponding to channel dependent portions of a separable system model associated with the particular X and Y location. To that end, the present method pre-computes one or more partial sums corresponding to one or more view and detector row pairs impacted by the one or more selected voxels using the particular X and Y location. Additionally, in certain embodiments, the present method may be configured to pre-compute the partial sums corresponding to only those detector rows that have not been computed in previous iterations, thus avoiding redundant calculations. More particularly, if the one or more partial sums are already available in a particular iteration, such as from a computation in a pervious iteration, there is no need to re-compute these partial sums. The pre-computing step, thus, may not be required for all partial sums unless the partial sums are, for example, unknown, unavailable and/or outside a certain limit, and therefore questionable.

In one exemplary implementation, the one or more partial sums may be computed prior to applying corresponding row-dependent portions of the system model. In an alternative implementation, however, the row-dependent portions may be computed earlier, or in parallel with the partial sums corresponding to the channel dependent portions. The present method, thus, uses the separability of the system model to simplify the update of the selected voxels by pre-computing the channel dependent portions. Accordingly, the present method, provides more efficient computation and memory access patterns than that used in conventional approaches that perform the direct computation and application of the system matrix A.

Accordingly, in one exemplary implementation, the present method assumes $i_v$, $i_r$, and $i_c$ to include the view, row, and channel information, respectively encoded in an index i. Further, the update equation 1 is written in separable form. To that end, the numerator of the update computed in equation 1 may be decomposed into the following equation 3 where the dependence of r and c on the (X, Y) location of voxel j has been ignored for brevity:

$$\sum_{v \in i_v} \sum_{m \in i_r} \sum_{k \in i_c} r_{(v,m,k,j)} c_{(v,m,k)} w_{(v,m,k)} e_{(v,m,k)} \quad (3)$$

Here, the row coefficient portion r does not depend on channel index k and the channel coefficient c does not depend on row coefficient m. Equation 1, therefore can be equivalently written in separable form as:

$$\sum_{v \in i_v} \sum_{m \in i_r} r_{(v,m,k,j)} \sum_{k \in i_c} c_{(v,m,k)} w_{(v,m,k)} e_{(v,m,k)} \quad (4)$$

Subsequent to the computation of the rightmost sum in equation 4, the resulting partial sums depend only on view and row coefficients, and therefore, a reasonably sized array of partial volumes may be pre-computed using:

$$N_{v,m} = \sum_{k \in i_c} c_{(v,m,k)} w_{(v,m,k)} e_{(v,m,k)} \quad (5)$$

Further, the image reconstructor may also compute a partial sum array to compute the denominator in equation 1 using:

$$D_{v,m} = \sum_{k \in i_c} c^2_{(v,k)} w_{(v,m,k)} \quad (6)$$

Additionally, at step 308, the image reconstructor computes row-dependent portions of the separable system model corresponding to the one or more selected voxels. As previously noted, the row-dependent portions correspond to the projection data domain. Further, as the system model is separable, the step 308 of computing the row-dependent portions becomes independent of the step 306 of pre-computing the one or more partial sums. The steps 306 and 308, thus, may be performed in any order or in parallel enabling the method to pre-compute the partial sums and the row-dependent portions of the system matrix that correspond to the selected voxel j independently.

Subsequently, at step 310, the one or more partial sums and the row-dependent portions are combined to compute corresponding updates for the one or more selected voxels. By way of example, the following equation may be used to compute the voxel update value $\Delta j$:

$$\Delta_j = \frac{\sum_{v \in i_v} \sum_{m \in i_r} r_{(v,m,j)} N_{v,m}}{\sum_{v \in i_v} \sum_{m \in i_r} r^2_{(v,m,j)} D_{v,m}} \quad (7)$$

In conventional reconstruction techniques, the error sinograms are updated next given the voxel update $\Delta j$ as shown in equation 2. In the present method, however, the error sinogram updates can be delayed until all of the desired updates of the one or more selected voxels associated with the particular (X, Y) location, but having different Z locations, have been computed. Instead, at step 312, the one or more partial sums are updated to be consistent with the computed updates for the selected voxels. Specifically, the partial sum calculations may be updated to be consistent with the new value for $x_j$ after being updated by $\Delta_j$. To that end, the numerator partial sums may be updated to be consistent with the newly computed voxel values as:

$$N_{v,m}^{new} = N_{v,m}^{old} + \Delta_j r_{(v,m,j)} D_{v,m} \quad (8)$$

Subsequently, at step 314, the computed voxel updates are applied to the corresponding voxels. The voxel update in the present method, thus, is accomplished without explicitly referencing either the w or e arrays. Here again, the update of voxel j by $\Delta_j$ can be delayed as long as it has been updated before its next explicit access. The present method may be repeated for further voxels until all desired locations are updated. To that end, the present method may reuse $N_{v,m}$ and $D_{v,m}$ for a voxel j+1, or any other voxel with the same (X, Y) location after having applied the partial sum update in equation 8.

The present method, thus, allows computation along the entire Z direction by operating on only a vector of size V×R rather than the full data set, where V and R correspond to the number of views and detector rows, respectively. After having computed all of the new voxel values, the actual error sinogram values may be updated. To that end, partial sums for the error sinogram update can be computed using the voxel update values $\Delta_1$ and the row-dependent portion of the system model, again of size V×R. Since all or a desired range of voxels in the Z direction are updated, the equation 2 may then be modified as:

$$\hat{e}_{(v,m,k)} = e_{(v,m,k)} + c_{(v,k)} + \sum_j \Delta_j r_{(v,m,j)} \quad (9)$$

The present method, thus, allows computation of the partial sums array $\Sigma_j \Delta_j r_{v,m,j}$ first, followed by the update of the error sinogram values. Furthermore, each error sinogram value needs to be modified only once, even when a corresponding correlation indicates that a particular error sinogram value was impacted or changed by multiple voxels j. Although, in the presently contemplated implementation, all of the $N_{v,m}$ and $D_{v,m}$ values may be pre-computed at once, in certain embodiments, these values may be computed on-demand to yield better memory performance based on specific system and application settings. In either case, each relevant $w_i$ and $e_i$ value may be read or written only once, thus reducing the computational effort and/or memory access involved in iterative image reconstruction.

Figure 4:
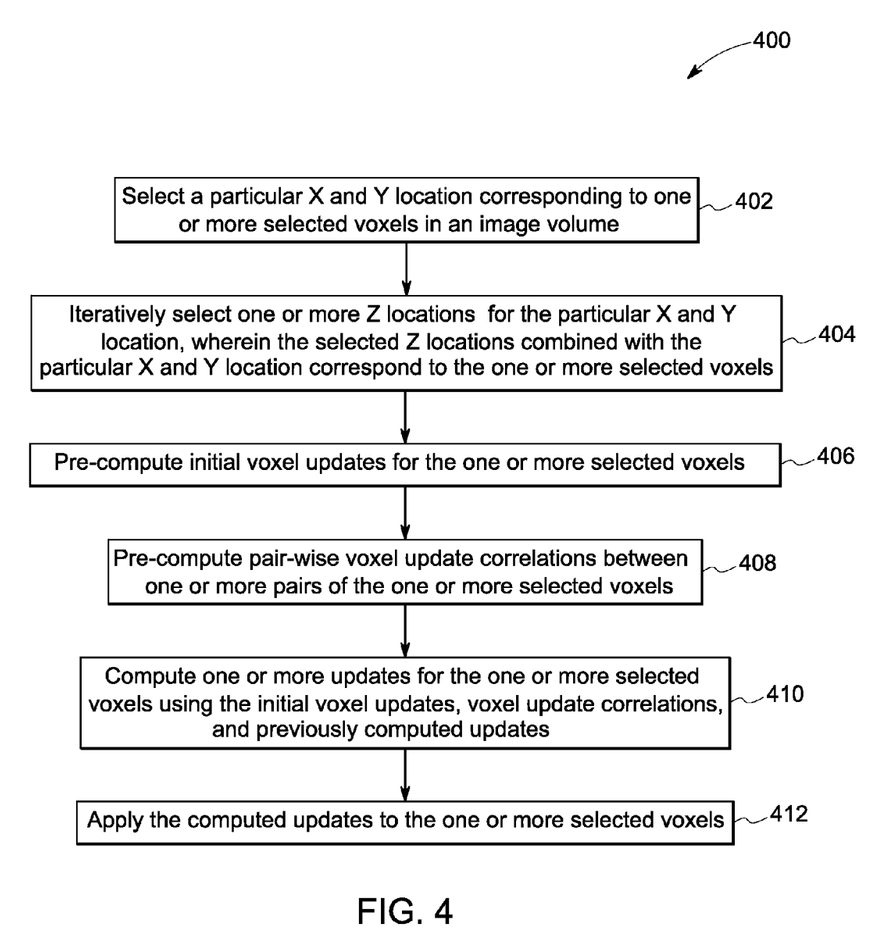
FIG. 4 is a flow chart depicting an alternative iterative image reconstruction method using a separable system model, in accordance with aspects of the present technique.

In certain embodiments, further improvements in image reconstruction speeds may be achieved by computing additional partial sums. To that end, FIG. 4 illustrates a flowchart 400 depicting an alternative method that performs additional pre-computations to further expedite image reconstruction. For clarity, the alternative method is described with reference to the equations and one or more steps of the method described in FIG. 3.

Accordingly, at step 402, the image reconstructor selects a particular X and Y location corresponding to one or more selected voxels in an image volume. Additionally, at step 404, one or more Z locations are iteratively selected for the particular X and Y location. The selected Z locations combined with the particular X and Y location correspond to the one or more selected voxels.

Further, at step 406, initial voxel updates for the one or more selected voxels are pre-computed. By way of example, if several voxel updates have been computed as described with reference to steps 310-314 of FIG. 3, then the new numerator value may be given by the following equation 10:

$$\sum_{v \in i_v} \sum_{m \in i_r} r_{(v,m,j)} N_{v,m}^{new} = \sum_{v} \sum_{m} r_{(v,m,j)} N_{v,m}^{old} + \sum_{k} \Delta_k \sum_{v} \sum_{m} Q_{j,k} \quad (10)$$

In equation 10, $Q_{j,k} = r_{(v,m,j)} r_{(v,m,k)} D_{v,m}$ accounts for voxel correlation. Specifically, if voxels j and k are not correlated, then $Q_{j,k} = 0$. In addition, $N_{v,m}^{old}$ corresponds to the old numerator value that has undergone no updates since its initial computation at the particular (X, Y) location.

Accordingly, the initial voxel updates $N_j^{old}$ may be pre-computed using the following equation:

$$N_j^{old} = \sum_{v \in i_v} \sum_{m \in i_r} r_{(v,m,j)} N_{v,m}^{old} \quad (11)$$

Further, at step 408, pair-wise voxel update correlations $B_{jk}$ between one or more pairs of the one or more selected voxels may be pre-computed, for example, using:

$$B_{jk} = \sum_{v \in i_v} \sum_{m \in i_r} r_{(v,m,j)} c_{(v,m,k)} D_{v,m} \quad (12)$$

As illustrated in equation 12, the computation of the voxel update correlations $B_{jk}$ is independent of the initial voxel update $N_j^{old}$ calculations of step 406. Accordingly, one or more of the voxel update correlations $B_{jk}$ can be pre-computed and stored.

Further, at step 410, the equation 7 may be updated to compute one or more updates for the one or more selected voxels using the initial voxel updates, voxel update correlations, and previously computed updates as:

$$\Delta_j^{(n)} = \frac{N_j^{old} + \sum_k \Delta_k^{(n-1)} B_{jk}}{B_{jj}} \quad (13)$$

where it is possible that a previous update for voxel j has been computed since the original computation of $N_j^{old}$. Equation 13, thus, can be used to compute an update for the voxel j with minimal computation by referencing the pre-computed initial voxel update and voxel update correlation terms. In particular, at step 412, the updates computed using the equation 13 are applied to the one or more selected voxels. Furthermore, while using the additional pre-computation scheme, an assumed limitation of voxel correlation may be imposed to decrease the total number of $B_{jk}$ values that must be computed. Particularly, the $B_{jk}$ values will only be non-zero when there is correlation between voxels j and k. Thus, if the system geometry is such that correlation is only significant for "nearby" voxels in the Z direction, then the pre-computation of the $B_{jk}$ values can be restricted to sets of "nearby" voxels. By way of example, if the voxel j is assumed to be only correlated with voxels j−1 and j+1, which are the neighboring or "nearby" voxels in Z, then $B_{jk}$ only needs to be computed where $|j-k| \leq 1$. Here, it may be noted that the $B_{jj}$ is equivalent to the value computed in the denominator of equation 7. Further, the error sinogram values and voxels may be updated using equation 9 as described with reference to FIG. 3.

Use of the separable system models in the present method substantially improves the image reconstruction performance. Particularly, the present method improves the imaging performance by reducing the number of computations and memory accesses associated with computing a voxel update. The pre-computation of the necessary values, thus, can be distributed to various computational resources, whereas the voxel update calculations corresponding to equation 13 can be quickly computed on fewer resources, thus reducing synchronization requirements.

Although the exemplary embodiments of the present technique are described with reference to medical imaging, use of the present iterative image reconstruction technique using separable system models in other non-invasive imaging contexts for imaging a plurality of objects is also contemplated. Accordingly, the present technique may be implemented in a plurality of imaging systems such as a single source imaging system, a multi-source imaging system, multi-detector imaging system, a photon counting energy discriminating detector imaging system, an X-Ray system, positron emission tomography (PET) scanner, a single photon emission computed tomography (SPECT) scanner, or any other suitable imaging system.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An image reconstruction method, comprising:
    selecting a particular X and Y location corresponding to one or more selected voxels in an image volume;
    iteratively selecting one or more Z locations for the particular X and Y location, wherein the selected Z locations combined with the particular X and Y location correspond to the one or more selected voxels;
    pre-computing one or more partial sums corresponding to channel dependent portions of a separable system model associated with the particular X and Y location;
    computing row-dependent portions of the separable system model, wherein computing the row-dependent portions of the separable system model is independent of the pre-computing the one or more partial sums;
    combining the one or more partial sums and the row-dependent portions of the separable system model to compute corresponding updates for the one or more selected voxels;
    updating the one or more partial sums to be consistent with the computed updates for the one or more selected voxels; and
    applying the computed updates to the one or more selected voxels, wherein applying the computed updates is independent of updating the one or more partial sums corresponding to the one or more selected voxels.

2. The method of claim 1, wherein pre-computing applies only to unknown partial sums.

3. The method of claim 1, wherein the separable system model comprises a distance-driven model, a separable footprint model, or a combination thereof.

4. The method of claim 1, further comprising reconstructing an image corresponding to at least a portion of a desired object using the one or more updated voxels.

5. The method of claim 1, further comprising applying updates to error sinograms consistent with the computed updates, wherein applying the updates to the error sinograms is independent of applying the computed updates to the one or more selected voxels.

6. The method of claim 1, wherein iteratively selecting one or more Z locations comprises selecting the Z location sequentially, randomly, simultaneously, or combinations thereof.

7. The method of claim 1, wherein pre-computing the one or more partial sums comprises pre-computing partial sums in a lower dimensional space influenced by the one or more selected voxels.

8. The method of claim 7, wherein the lower dimensional space comprises views and detector row dimensions but not the dimension corresponding to detector channels within a fixed row.

9. The method of claim 1 being repeated for additional Z locations at the particular X and Y location until a desired number of voxels corresponding to at least a portion of a desired object is updated, wherein the voxels are updated one or more times.

10. The method of claim 9, wherein the one or more partial sums are reused for updating subsequent voxels.

11. The method of claim 9, further comprising updating an error sinogram value corresponding to each voxel only once.

12. The method of claim 9, further comprising:
computing partial error sinogram updates corresponding to the one or more selected voxels using the computed voxel updates and the row-dependent portion of the system model such that the partial error sinogram updates are computed in a first dimension lower than a second dimension, wherein the first dimension comprises views and detector rows, and wherein the second dimension comprises the views, the detector rows, and detector channels impacted by the one or more selected voxels; and
computing and applying full error sinogram updates by combining the partial error sinogram updates and the channel-dependent portion of the separable system model.

13. The method of claim 12 being repeated for additional X and Y locations until a desired number of voxels corresponding to at least a portion of a desired object is updated, wherein the voxels are updated one or more times.

14. The method of claim 1 being implemented in an imaging system, wherein the imaging system comprises a computer tomography (CT) system, a positron emission tomography (PET) scanner, a single photon emission computed tomography (SPECT) scanner, a baggage screening system, an industrial inspection screening system, or combinations thereof.

15. An image reconstruction method, comprising:
selecting a particular X and Y location corresponding to one or more selected voxels in an image volume;
iteratively selecting one or more Z locations for the particular X and Y location, wherein the selected Z locations combined with the particular X and Y location corresponds to the one or more selected voxels, and wherein the particular X and Y location and the selected Z locations are associated with a separable system model;
pre-computing initial voxel updates for the one or more selected voxels;
pre-computing pair-wise voxel update correlations between one or more pairs of the one or more selected voxels;
computing one or more updates for the one or more selected voxels using the initial voxel updates, voxel update correlations, and previously computed updates; and
applying the computed updates to the one or more selected voxels.

16. The method of claim 15, further comprising applying updates to error sinograms consistent with the computed updates, wherein applying the updates to the error sinograms is independent of applying the computed updates to the one or more selected voxels.

17. The method of claim 15, wherein the voxel update correlations are computed for specified pairings of selected voxels.

18. The method of claim 15, wherein the voxel update correlations are assumed to be zero for specified pairings of selected voxels.

19. The method of claim 15, further comprising:
computing partial error sinogram updates corresponding to the one or more selected voxels using the computed voxel updates and the row-dependent portion of the system model such that the partial error sinogram updates are computed in a first dimension lower than a second dimension, wherein the first dimension comprises views and detector rows, and wherein the second dimension comprises the views, the detector rows, and detector channels impacted by the one or more selected voxels; and
computing and applying full error sinogram updates by combining the partial error sinogram updates and the channel-dependent portion of the separable system model.

20. A non-transitory computer readable storage medium with an executable program thereon for iterative image reconstruction, wherein the program instructs a processing unit to perform the following steps:
selecting a particular X and Y location corresponding to one or more selected voxels in an image volume;
iteratively selecting one or more Z locations for the particular X and Y location, wherein the selected Z locations combined with the particular X and Y location correspond to the one or more selected voxels;
pre-computing one or more partial sums corresponding to channel dependent portions of a separable system model associated with the particular X and Y location, wherein the one or more partial sums have not been previously computed;
computing row-dependent portions of the separable system model, wherein computing the row-dependent portions of the separable system model is independent of pre-computing the one or more partial sums;
combining the one or more partial sums and the row-dependent portions of the separable system model to compute corresponding updates for the one or more selected voxels;
updating the one or more partial sums to be consistent with the computed updates for the one or more selected voxels; and
applying the computed updates to the one or more selected voxels, wherein applying the computed updates is independent of updating the one or more partial sums corresponding to the one or more selected voxels.

* * * * *